(12) United States Patent
Haines

(10) Patent No.: US 10,692,048 B2
(45) Date of Patent: Jun. 23, 2020

(54) APPARATUS AND METHOD FOR GENERATING A CHRONOLOGICAL TIMESHEET

(71) Applicant: WISETIME PTY LTD, Wembley WA (AU)

(72) Inventor: Thomas Haines, Wembley (AU)

(73) Assignee: PRACTICE INSIGHT PTY LTD, West Leederville (AU)

( * ) Notice: Subject to any disclaimer, the term of this patent is extended or adjusted under 35 U.S.C. 154(b) by 819 days.

(21) Appl. No.: 14/271,691

(22) Filed: May 7, 2014

(65) Prior Publication Data

US 2014/0344119 A1   Nov. 20, 2014

(30) Foreign Application Priority Data

May 8, 2013   (AU) ................. 2013901625
May 20, 2013  (AU) ................. 2013901774
Aug. 25, 2013 (AU) ................. 2013903226

(51) Int. Cl.
   *G06Q 10/10* (2012.01)
   *G06F 16/35* (2019.01)

(52) U.S. Cl.
   CPC ......... *G06Q 10/1091* (2013.01); *G06F 16/35* (2019.01); *G06Q 10/109* (2013.01)

(58) Field of Classification Search
   CPC .. H04N 19/60; H04N 19/635; G06Q 10/0631; G06Q 40/125; G06Q 10/063114; G06Q 10/10; G06Q 10/1091; G06Q 10/109; G06F 16/35

USPC ...................................... 705/32, 30
See application file for complete search history.

(56) References Cited

U.S. PATENT DOCUMENTS

| 6,535,870 | B1 * | 3/2003 | Friske ............... G06F 17/30368 |
| 6,640,015 | B1 * | 10/2003 | Lafruit .................. H04N 19/63 382/240 |
| 2002/0010663 | A1 * | 1/2002 | Muller .................. G06Q 40/00 705/30 |
| 2003/0046135 | A1 * | 3/2003 | Cartwright ........... G06Q 10/063 705/7.17 |

(Continued)

*Primary Examiner* — Florian M Zeender
*Assistant Examiner* — Milena Racic
(74) *Attorney, Agent, or Firm* — Maier & Maier, PLLC

(57) ABSTRACT

The present invention relates to an improved method of generating a passive chronological timesheet for users of computing devices having a graphical user interface. A computer implemented method for generating a chronological timesheet for a computing device user over a given time period is provided, the method comprising the steps of receiving a set of user activity data records associated with a user identifier for time period, each user activity data record containing a time representation including duration value and descriptive element of action performed by user on computing device during time representation; applying a high-pass filter to the set of user activity data records to form a filtered set of user activity data records; creating an expanded set of user activity data records, wherein the duration value of the user activity data records is greater than the corresponding user activity data record of the filtered set of user activity data records, and whereby aggregate of duration values of the filtered set of user activity data records is less than or equal to the duration of the given time period.

15 Claims, 9 Drawing Sheets

(56) References Cited

U.S. PATENT DOCUMENTS

| | | | | |
|---|---|---|---|---|
| 2003/0046321 A1* | 3/2003 | Raymond | ............... | G06T 5/20 |
| | | | | 708/300 |
| 2006/0010051 A1* | 1/2006 | Sattler | ............... | G06Q 10/1091 |
| | | | | 705/32 |
| 2007/0100714 A1* | 5/2007 | Walker | ............... | G06Q 10/1091 |
| | | | | 705/32 |
| 2007/0282721 A1* | 12/2007 | Ducolon | ............... | G07C 1/10 |
| | | | | 705/32 |
| 2010/0030605 A1* | 2/2010 | Cargille | ............... | G06Q 10/063114 |
| | | | | 705/7.15 |
| 2010/0100463 A1* | 4/2010 | Molotsi | ............... | G06Q 40/12 |
| | | | | 705/32 |
| 2011/0302003 A1* | 12/2011 | Shirish | ............... | G06Q 10/0639 |
| | | | | 705/7.38 |
| 2013/0297468 A1* | 11/2013 | Hirsch | ............... | G06Q 40/00 |
| | | | | 705/32 |
| 2014/0188577 A1* | 7/2014 | Gerber | ............... | G06Q 10/06398 |
| | | | | 705/7.42 |
| 2014/0258057 A1* | 9/2014 | Chen | ............... | G06Q 10/105 |
| | | | | 705/32 |

* cited by examiner

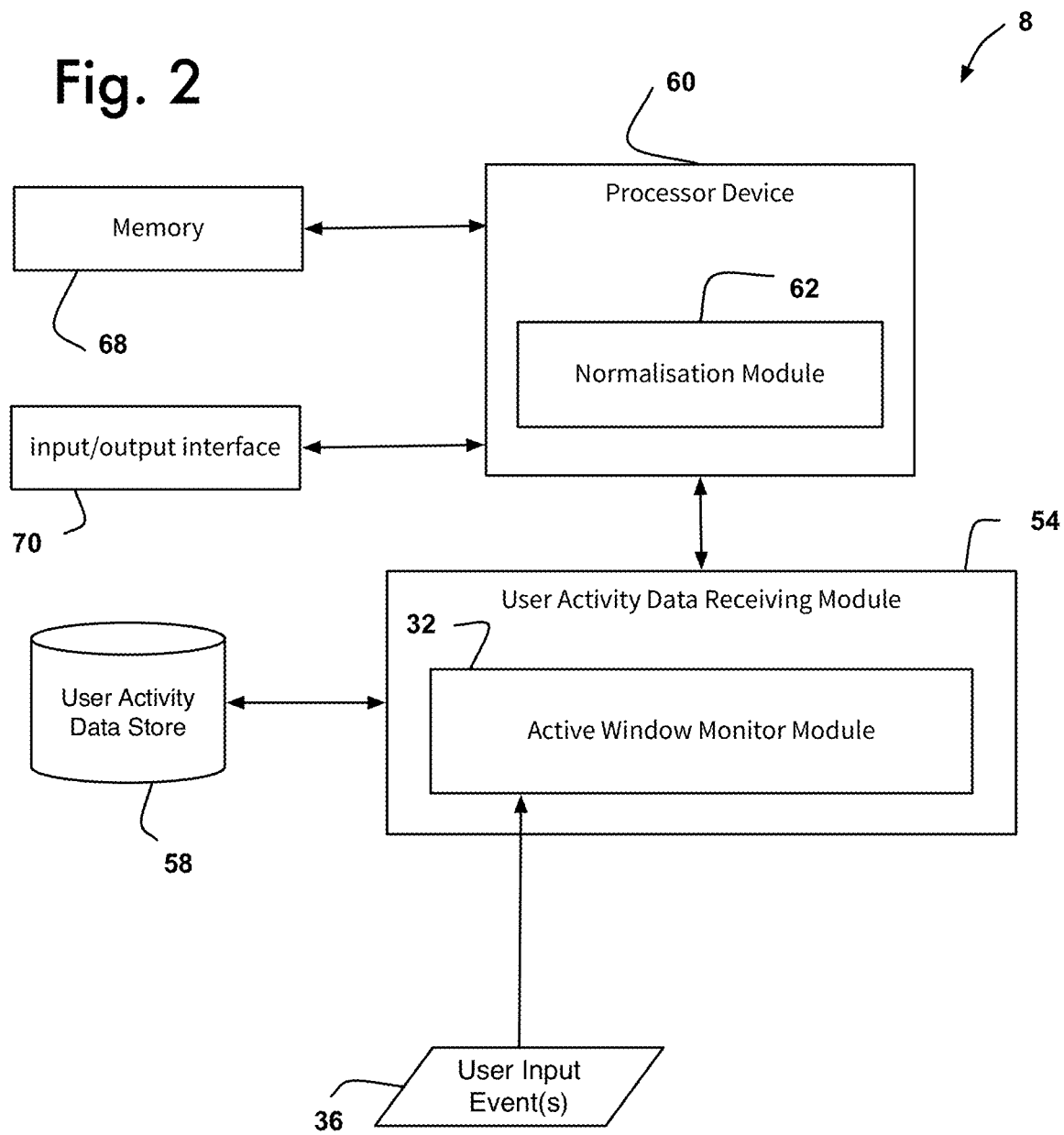

2004-09-15 10:00-10:06; user: Max.Mustermann

| duration (secs) | application name | window title |
|---|---|---|
| 1 | System Preferences | DELL 2405FPW |
| 1 | Preview | example.png |
| 44 | Adium | Gayle Mason |
| 3 | Chrome | Is dual-monitor capture provided on Windows client? |
| 6 | Thunderbird | re: leave request |
| 192 | Chrome | lynda.com : Online Training Library I MS Word |
| 41 | Chrome | youtube.com : Word 2010: Styles - YouTube |
| 2 | Preview | GHF_brochure v2.pdf |
| 3 | Preview | image001-1.png |
| 2 | transmit | linode |
| 3 | Finder | Tool-Shed |

Total: 300 seconds                                              (first set)

2004-09-15 10:00-10:06; user: Max.Mustermann

| duration (secs) | application name | window title |
|---|---|---|
| 44 | Adium | Gayle Mason |
| 6 | Thunderbird | re: leave request |
| 192 | Chrome | lynda.com : Online Training Library I MS Word |
| 41 | Chrome | youtube.com : Word 2010: Styles - YouTube |

Total: 283 seconds                                    (high-pass filter applied)

2004-09-15 10:00-10:06; user: Max.Mustermann

| duration (secs) | application name | window title |
|---|---|---|
| 47 | Adium | Gayle Mason |
| 6 | Thunderbird | re: leave request |
| 204 | Chrome | lynda.com : Online Training Library I MS Word |
| 43 | Chrome | youtube.com : Word 2010: Styles - YouTube |

Total: 300 seconds (third set of user activity data records)

Fig. 6

TimeSheet of Max.Mustermann
2004-09-15 10:00-10:12

10:00-10:06

| | | |
|---:|---|---|
| 47s | Adium | Gayle Mason |
| 6s | Thunderbird | re: leave request |
| 3m24s | Chrome | lynda.com : Online Training Library I MS Word |
| 43s | Chrome | youtube.com : Word 2010: Styles - YouTube |

10:06-10:12

| | | |
|---:|---|---|
| 2m46s | eclipse | Java – pi-data-model/resources/persistence.xml |
| 55s | eclipse | Java – pi-data-model/resources/datasources.xml |
| 31s | libreoffice | Practice Insight.ods - LibreOffice Calc |
| 48s | Preview | GHF_brochure v4.pdf |

(formatted output)

NSObject

△

NSEvent

(id)addGlobalMonitorForEventsMatchingMask:(NSEventMask)mask handler:
(void (^)(NSEvent*))block

Fig. 7b

```
#!/usr/bin/osascript
global frontApp, frontAppName, windowTitle tell application "System Events"
 set frontApp to first application process whose frontmost is true
 set frontAppName to name of frontApp
 tell process frontAppName
  tell (1st window whose value of attribute "AXMain" is true)
   set windowTitle to value of attribute "AXTitle"
  end tell
 end tell
end tell
return {frontAppName, windowTitle}
```

APPARATUS AND METHOD FOR GENERATING A CHRONOLOGICAL TIMESHEET

TECHNICAL FIELD

The present invention is related to the field of timesheet recordal. In particular, the present invention relates to an improved method of generating a passive chronological timesheet for users of computing devices having a graphical user interface.

DESCRIPTION OF THE RELATED ART

Manually inputting timesheets is a necessary but very time consuming and generally inaccurate activity engaged in by a myriad of knowledge workers. The timesheet recipient requires that detailed and accurate information is contained therein, so that the information can be utilised to more efficiently allocate finite technical and environment resources. It is beneficial for the timesheet information to be produced in a time-efficient manner.

Current technologies that aim to improve the efficiency of producing timesheet information predominately fall into one of two categories: a) start/stop timers, and b) screen/image recorders.

The start/stop timers include an activity selector and a "start/stop" button, and record the time period between when the user presses start and the user presses stop. These rely on the user activity remembering to press the start and stop buttons, and the change the activity selector throughout each day. The start/stop timer systems are hence error prone and onerous.

The screen recorder systems record a 'snapshot' of the user's screen at intervals during the day. There are many problems with this approach, including that more surveillance data than is necessary for the task outcome is recorded; the volumes of data produced are significant, they are extremely time consuming to review, and they may record confidential or personal information. They are more suited as a surveillance tool than to timesheet recordal.

Yet another approach to timesheet recordal is to record all of a user's interactions with the computer, and then aggregate or group the information for presentation to the user, with the goal of allowing that user to improve their personal time productivity. For example, the user may learn that they spent 3 hours reading email on a given day, or that he or she spent 18 minutes on Wikipedia, or 6 seconds at "bioceuticals.com". This type of time expenditure information can be useful for optimising how time is best spent on competing priorities. However, this form of recordal does not substitute for the chronological narrative that a timesheet must embody.

When processing user interactions, if all of the events and actions of the user were to be arranged in chronological order, the information is indigestible, because it is voluminous, and each item, of which are of vastly differing importance, must be consumed by the reader in turn. This is because users typically switch from input type to input type frequently.

Therefore, there is a need in the art to address and/or ameliorate the aforementioned problem.

SUMMARY OF INVENTION

According to one embodiment, a computer implemented method for generating a chronological timesheet for a computing device user over a given time period is provided, the method comprising the steps of: receiving a first set of user activity data records associated with a user identifier for time period, each user activity data record containing a time representation including duration value and descriptive element of action performed by said user on computing device during time representation; applying a high-pass filter to the first set of user activity data records to form a filtered second set of user activity data records; creating an expanded third set of user activity data records from the second set of user activity data records, wherein the duration value of one or more user activity data records is greater than the corresponding user activity data record of the filtered second set of user activity data records, and whereby aggregate of duration values of the third set of user activity data records is less than or equal to the duration of the given time period.

By filtering the number of user activity data records, statistically insignificant user activity records are removed from the chronological timesheet. By subsequently expanding the duration values of one or more user activity data records, the chronological record embodies an aggregate time duration that is consistent with the actual spent using the computer device user for the given time period.

As will be appreciated that, specifically in multiuser environments, the number of activity data records may grow to a size within a short period of time while the information included may only be of little use if not further processed. The invention provides a method to manage also large numbers of data records and extract meaningful high-level information.

In an embodiment of the method of the invention, the duration value of one or more user activity data records is expanded using function $$\delta\left(\frac{durationValue}{\beta}\right),$$

whereby $\delta$ is the numerical difference between the aggregate duration values of the first and second sets of user activity data records, and whereby $\beta$ is the aggregate of duration values in the second set of user activity data records.

In another embodiment, the duration value of one or more user activity data records is expanded using function $$\delta\left(\frac{1}{\Psi}\right),$$

whereby $\delta$ is the numerical difference between the aggregate duration values of the first and second sets of user activity data records, and whereby $\Psi$ is the number of records in the second set of user activity data records.

Expanding the duration values of the user activity data records remedies the issue of inconsistent aggregate duration of values following application of the high pass filter on the to the first set of user activity data records. Specifically, over time, adaptation of both the function and the parameters of the expansion can be optimized in a recursive manner and, this way, the accuracy of the resulting time sheet improved.

In another embodiment of the method of the invention, a precursory step of dividing said given time period into a sequence of lesser-duration time periods of predetermined duration is performed, and whereby a timesheet for each said lesser-duration time periods is generated, and a further subsequent step of collating each timesheet into chronological order is performed to generate a timesheet for said given time period.

Generation of lesser-duration time periods and subsequent collation thereof, while initially increasing the total number of data records, provides for more flexibility in the adaptation of the method of the invention to individualized needs and implementations, and thus more accurate timesheet results downstream.

In yet another embodiment of the method of the invention, the first set of user activity data records are gathered by a further step of registering to receive user input events of a computing device using a windowing system that the computing device user is operating, and recording the window particulars of the foremost window of the computing device as user input events are received to create a user activity data records associated with a user identifier.

This allows generation of user activity data records in an automatic manner so that the user is not required to enter any information into the system, yet the system will still produce a sufficiently accurate representation of the user activity and thus generation of a suitable time sheet. Specifically, such operation may provide accurate tracking of user activity and provide a suitable database for long-time or large-scale user activity monitoring.

According to another aspect of the invention, a timesheet generator apparatus for generating a chronological timesheet for a computing device user over a given time period on a computer system comprising: a memory; a user activity data receiving module configured to receive a first set of user activity data records for the time period associated with a user identifier, each user activity data record containing a time representation including duration value and descriptive element of action performed by said user on computing device during time representation; a processor device operatively coupled to the memory and user activity data receiving module, the processor device configured to implement a normalisation module, and the normalisation module configured to: apply a high-pass filter to the first set of user activity data records to form a filtered second set of user activity data records; create an expanded third set of user activity data records from the second set of user activity data records, wherein the duration value of one or more user activity data records is greater than the corresponding user activity data record of the filtered second set of user activity data records, and whereby aggregate of duration values of the second set of user activity data records is less than or equal to the duration of the given time period.

By filtering the number of user activity data records, statistically insignificant user activity records are removed from the chronological timesheet by the normalisation module. By subsequently expanding the duration values of one or more user activity data records, the chronological record embodies an aggregate time duration that is consistent with the actual spent using the computer device user for the given time period.

In an embodiment of the timesheet generator of the invention, the processor device expands the duration value of one or more user activity data records by function $$\delta\left(\frac{durationValue}{\beta}\right),$$

whereby $\delta$ is the numerical difference between the aggregate duration values of the first and second sets of user activity data records, and whereby $\beta$ is the aggregate of duration values in the second set of user activity data records.

In another embodiment of the timesheet generator of the invention, the processor device expands the duration value of one or more user activity data records by function $$\delta\left(\frac{1}{\Psi}\right),$$

whereby $\delta$ is the numerical difference between the aggregate duration values of the first and second sets of user activity data records, and whereby $\Psi$ is the number of records in the second set of user activity data records.

As explained above, expanding the duration values of the user activity data records remedies the issue of inconsistent aggregate duration of values following application of the high pass filter on the to the first set of user activity data records. Specifically, over time, adaptation of both the function and the parameters of the expansion can be optimized in a recursive manner and, this way, the accuracy of the resulting time sheet improved.

In another embodiment of the timesheet generator of the invention, the processor device first divides said given time period into a sequence of lesser-duration time periods of predetermined duration, whereby a timesheet for each said lesser-duration time periods is generated, and the processor device subsequently collates each timesheet into chronological order to generate the timesheet for said given time period.

In yet another embodiment of the timesheet generator of the invention, the user activity data receiving module further comprises an active window monitor module, to monitor the active window title of a computing device, by registering to receive user input events of the computing device using a windowing system, and obtaining the window title of the foremost window of the computing device when user input events are received to thereby generate user activity data records, whereby the active window monitor module may persist user activity data records to a user activity data store.

As indicated above, this embodiment allows generation of user activity data records in an automatic manner so that the user is not required to enter any information into the system, yet the system will still produce a sufficiently accurate representation of the user activity and thus generation of a suitable time sheet. Specifically, such operation may provide accurate tracking of user activity and provide a suitable database for long-time or large-scale user activity monitoring. In this context, the active window monitoring module may be implemented as a process in itself that may be hidden and/or running as a background process of the operating system. Storing the user activity data records in a user activity data store saves the data for archiving purposes and, in particular, provides a basis for long-term or large-scale analyses, such as trend analyses, and potentially further statistics.

The specific features of the embodiments described above can be combined as needed for a specific application. Although not all combinations of features have been described in detail, they have been considered and evaluated in the context of the development of the present invention and are merely omitted for the sake of brevity. Further, reference is made to the below detailed description of embodiments of the invention which help to understand certain features better and provide additional support for combinations thereof.

BRIEF DESCRIPTION OF DRAWINGS

These and/or other aspects and advantages of the invention will become apparent and more readily appreciated from the following description of the embodiments, taken in conjunction with the accompanying drawings of which:

FIG. 2 is a block diagram illustrating one embodiment of a timesheet generator apparatus for generating a passive chronological timesheet for a computing device user over a given time period on a computer system.

FIGS. 3a-3c illustrates by example the steps of one embodiment of generating a chronological timesheet.

FIG. 6 is an example chronological timesheet according to one embodiment.

FIG. 7a represents the 'Cocoa' class needed to capture user input events on Mac OS X.

FIG. 7b is a sample method that can be used to capture the active application name and window title, using 'AppleScript' on Mac OS X.

DESCRIPTION OF EMBODIMENTS

Although the description has been described with respect to particular embodiments thereof, these particular embodiments are merely illustrative, and not restrictive. The specification makes reference to example categories of users (preferably knowledge workers) such as accountants and attorneys. These examples are for illustrative purposes only, and should not be considered as restricting the scope of application of the invention as limited to any given type or genus of worker. The invention may preferably have utility in any organisation that employs users that engaged to complete various tasks, preferably using computing devices.

Figure 1:
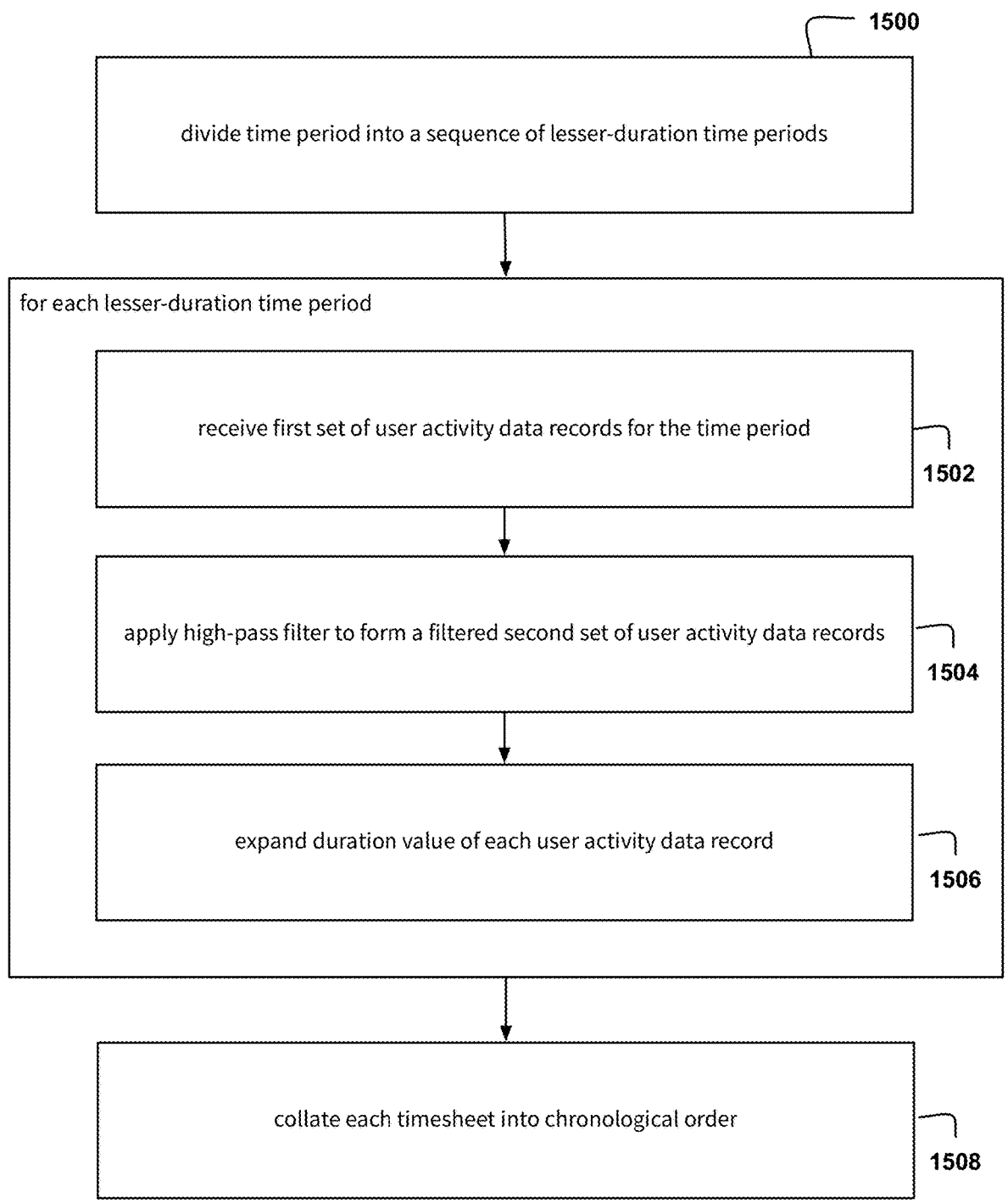
FIG. 1 is a flow chart of algorithmic operations of an active window monitor module and including user activity data store/record synchronization to an upstream server according to an embodiment.

With reference to FIG. 1, an overview of the steps of a method for generating a chronological timesheet 6 for a computing device 14 user over a given time period is hereby described. For explanatory purposes, we shall describe the steps by using an example given time period of Wednesday 15 Sep. 2004 09:54-10:18; and computing device 14 of a laptop computer device running the OS X operating system in this embodiment. In the present example, a timesheet 6 for user Max Mustermann is to be generated.

A first step of dividing given time period into a sequence of lesser-duration time periods of predetermined duration is performed at 1500. Considered in conjunction with the form of high-pass filter that is used (described later herein), a shorter predetermined duration will generally result in a higher number of records, and conversely, a longer predetermined duration will result in a lower number of records. The predetermined duration should be selected based on the requirements of the user. In the present embodiment, a predetermined duration of 6 minutes is used. Hence, example time period 09:54-10:18 is divided into a set of lesser-duration time periods: 9:54-10:00, 10:00-10:06, 10:06-10:12 and 10:12-10:18. In this description, the start of the period is inclusive and the end of the period is exclusive. By example for time period 10:00-10:06, any event that both greater than or equal to time value 10:00 and less than 10:06.

[41] To generate the timesheet for 2004-09-15 10:00-10:06, a first set of user activity data records 72 is received. The embodiment may include active window monitor module 32 (described later herein) to generate, retain and provide the first set of user activity data records 72. Alternatively, the first set of user activity data records 72 may be received from a third-party's system, such as receipt over a network from a data-server provider. The first set of user activity data records is associated with a user identifier (in this case, with user Max Mustermann).

Each user activity data record 64 contains a time representation including duration value and descriptive element of action performed by the user on computing device 14 during time representation. The time representation could be in the form of a duration value in seconds. The time representation may include a start timestamp. The duration value could be in the form of the combination of a start timestamp and an end timestamp.

In the present embodiment, the descriptive element of action performed by the user is a description of application name and window title (described later herein) in use by user. An example first set of user activity data records is illustrated in FIG. 3a.

A high-pass filter is applied to the first set of user activity data records 72 to form a filtered second set of user activity data records 74 at 1504. A high-pass filter is an electronic filter that allows high duration value rows to pass, but does not allow rows with duration values lower than a cut-off determinate to pass. In the present embodiment, the cut-off determinate is that the duration value must be greater than 5 seconds. As an alternatives, the cut-off determinate may act on a first set of user activity data sorted by descending duration value, and for example only allow the top 30% of rows or top 5 rows in the first set to pass.

By way of illustration, the high-pass filter of the present embodiment is applied to the first set of user activity data records 72 illustrated in FIG. 3a, to form the filtered second set of user activity data records 74 illustrated in FIG. 3b. As one example of the operation of the high-pass filter of the present embodiment, the first row (1 second, System Preferences—DELL 2405FPW) was less than the 5-second cut-off determinate, and hence is not present in the filtered set of user activity data records 74.

It should be noted that the second set of user activity data records 74 of user Max Mustermann now totals 283 seconds (despite the actual time spent on the computing device being 300 seconds). An advantage of applying the high-pass filter is to reduce the amount of insignificant and/or irrelevant information, and hence, to make the timesheet into a form that can be readily understood by the reader. However, in the situation of a timesheet, it may present a problem in that the time logged for the given time period is not equal to the aggregate of the duration values. In the example where a recipient is using the aggregate of the duration values for analysis or calculation, the need to have the insignificant and/or irrelevant information removed from their data set should be achieved without impacting on the validity of the aggregate duration values.

To remedy the issue of inconsistent aggregate duration of values explained above, a step of creating an expanded third set of user activity data records 76 from the second set of user activity data records 74, wherein the duration value of one or more user activity data records 76 is performed at 1506. The aggregate of duration values of the third set of user activity data records 76 is less than or equal to the duration of the given time period. In the present example illustrated in FIGS. 3a-3c, the aggregate of duration values of the third set of user activity data records 76 should be less than or equal to 300 seconds. The term expanded in this context means that the duration value in the third set of user data records 76 is longer in duration than the corresponding duration value of the user activity data record in the second set of user activity data records 74.

For the step of creating an expanded third set of user activity data records 76 at 1506, the present embodiment firstly makes a copy of the second set of user activity data records 74. Next, the aggregate of duration values in the second set of user activity data records is stored as β. δ is the numerical difference between the aggregate duration values of the first and second sets of user activity data records. In the example of FIGS. 3a-3c, δ is equal to 17 seconds (300–283), and β is equal to 283.

In the case that δ is a positive value, each user activity data record is examined to determine an expansion value, and expand the duration value by the expansion value. The expansion value of the present embodiment is calculated using function $$\delta\left(\frac{durationValue}{\beta}\right).$$

Continuing with example in FIG. 3b, expansion value for the first row is calculated as $$17\left(\frac{44}{283}\right).$$

The expansion value of 2.6431 is added to the value (44 seconds), to create an expanded duration value of 47 seconds (rounded, see FIG. 3c).

An alternative function may be used $$\delta\left(\frac{1}{\beta}\right).$$

where Ψ is the number of records in the second set of user activity data records. If this function were applied to the same record, the expansion value of 4.25 is derived from $$17\left(\frac{1}{4}\right),$$

to create an expanded duration value of 48 seconds.

A timesheet for each of the six minute time periods is generated and the timesheet is collated into its chronological order to generate a complete timesheet for the given time period at 1508. An example collated chronological timesheet 6 is provided in FIG. 6. This is one example of presenting the chronological timesheet. The set of user activity data records may be used in other contexts, such as saved into a database for subsequent analysis.

A timesheet generator apparatus 8 for generating a chronological timesheet for a computing device 14 user over a given time period on a computer system is herein described. With reference to FIG. 2, the timesheet generator apparatus includes a memory 106, a user activity data receiving module 54 and a processor device 60 operatively coupled to the memory 106 and user activity data receiving module 54.

The user activity data receiving module 54 is configured to perform step 1502 described herein. The processor device is configured to implement a normalisation module 62. The normalisation module 62 is configured to perform steps 1504 and 1506. The user activity data receiving module 54 includes an active window monitor module 32, to monitor the active window title of a computing device 14, by registering to receive user input events 36 of the computing device 14 using a windowing system, and obtaining the window title of the foremost window of the computing device operating system 34 when user input events 36 are received to thereby generate user activity data records. The active window monitor module 32 persists user activity data records to a user activity data store 58. The user activity data store 58 may take the form of a SQL relational database, such as MySQL. The active window monitor module 32 is described in further detail below.

A further step of registering to receive user input events 36 of a computing device using a windowing system that the computing device user is operating, and recording the window particulars of the foremost window of the computing device 14 as user input events 36 are received to create a user activity data records associated with a user identifier, is described for the embodiment. The embodiment preferably includes an active window monitor module 32 (also described as taking the form of a 'window title monitor module'). The active window monitor module 32 generates user activity data records. The user activity data records are stored in a user activity data store 58. The active window monitor module 32 is responsible for querying, polling or otherwise ascertaining the active activity (i.e. the 'foremost') that the user is engaged with on a given computing device 14. This usually takes the form of a 'window', and each window preferably contains information about the application that created the window, and information about the contents of the window. This could take the form of a visual textual string presented to the user, or it could be hidden from the user, but available programmatically, or via alternative means such as audible information that may be played to the user.

Figure 4:
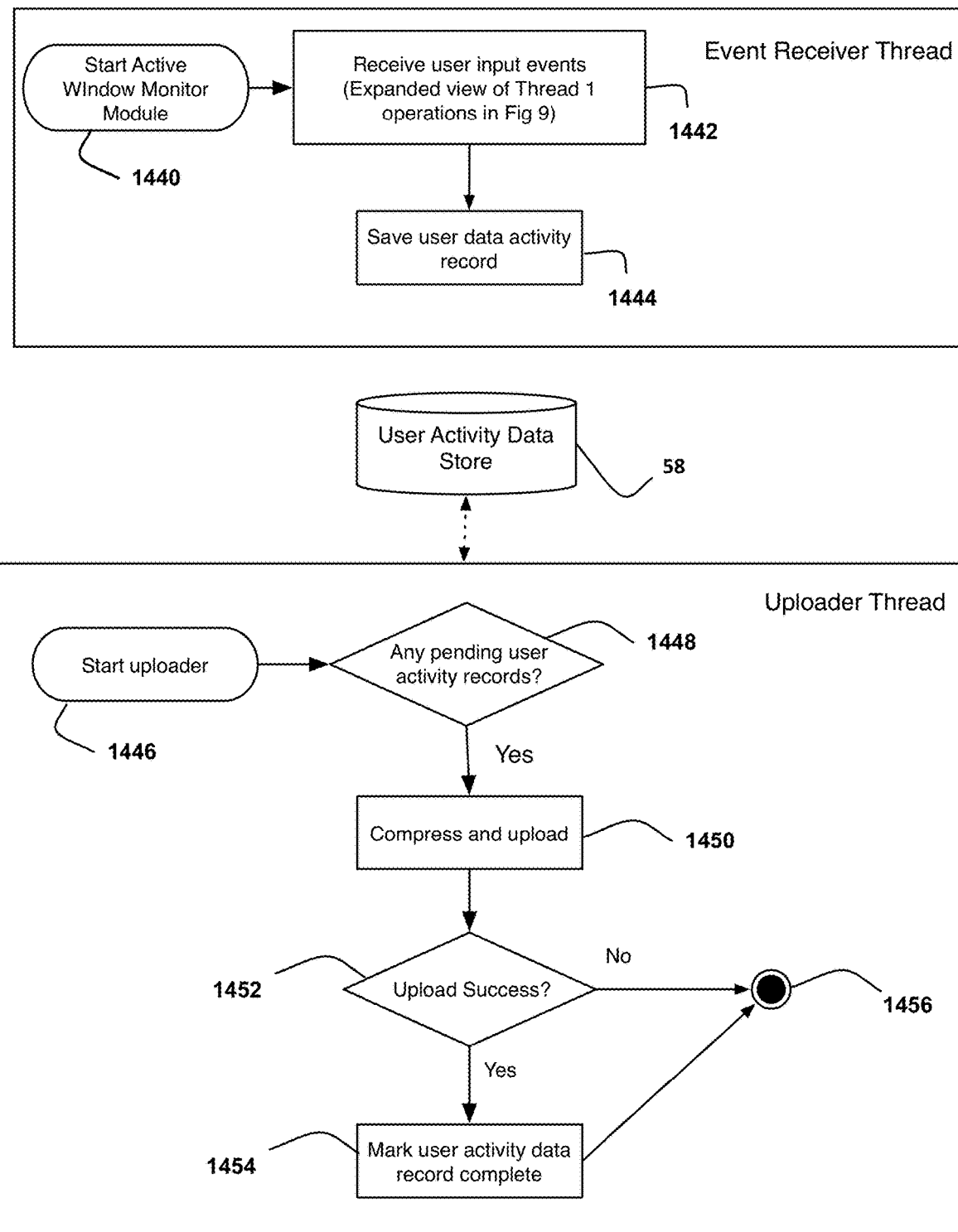
FIG. 4 is a flow chart of algorithmic operations of an active window monitor module and including user activity data store/record synchronization to an upstream server according to an embodiment.

A set of preferred steps of the active window monitor module 32 are illustrated in FIG. 4. The 'event receiver thread' process starts at 1440. The active window monitor module 32 receives a plurality of user input events at 1442. This is explained further below with reference to FIG. 5. As each user input event is received, it is transformed into user activity record by adding the username and removing certain particulars (described in another portion of specification), and is preferably saved to a local storage location, such as the memory or disk storage of the computing device 14 at 1444. In some limited cases, such as where the user activity data store 58 is hosted locally on the computing device 14, it may be preferable to save each user input events to the user activity data store 58 as it is received.

A second thread of the active window monitor module 32 is illustrated in FIG. 4 in the bottom rectangular box labelled 'Uploader Thread'. The Uploader Thread runs periodically, starting at 1446. It checks the local storage location where the user activity record are stored if there are any user activity records available that are pending (in the sense they have not been uploaded to the user activity data store 58) at 1448. For any records that are found, they are compressed into a bundle of records, and uploaded to the user activity data store 58 at 1450. If the upload was successful at 1452, the user activity data record(s) are marked as complete at 1454, and the process completes at 1456. If the upload was not successful at 1452, the process completes at 1456. In the case that upload was not successful, the records will try to be uploaded again when the process runs again.

Figure 5:
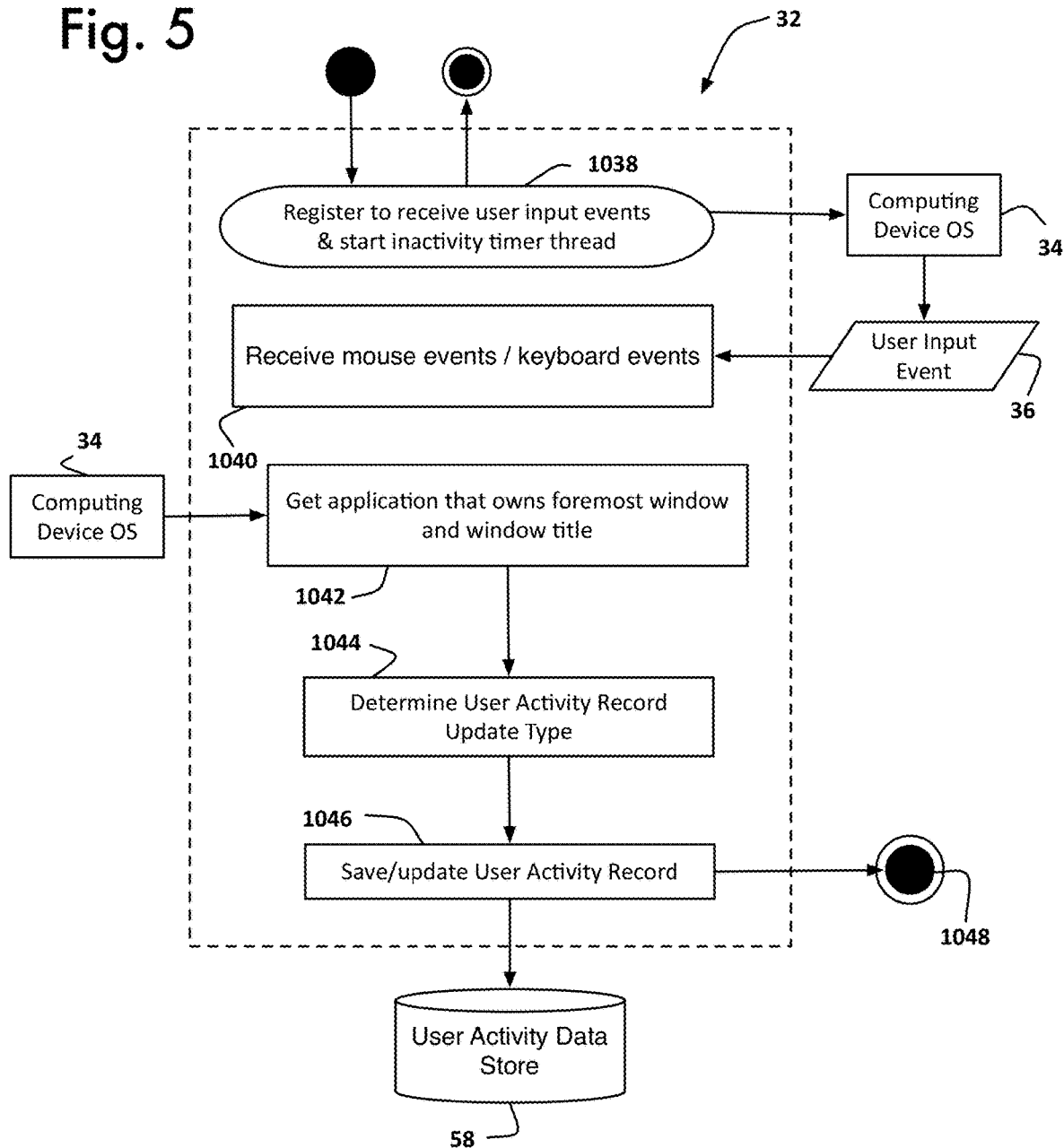
FIG. 5 is a flow chart of algorithmic operations of an active window monitor module according to an embodiment.

With reference to FIG. 5, active window monitor module 32 preferably registers to receive user input events from the host operating system of the worker's computing device 14 at 1038. It may also start an inactivity timer thread. An example method of registering to receive user input events is shown in FIG. 7a.

With reference to FIG. 4, upon the active window monitor module 32 receiving user input events 36, the application owner of the foremost window (also called the active window) and window title of the active window are obtained from the computing device operating system 34 at 1040. A user input event 36 may preferably include the mouse being moved or clicked, keys on a keyboard being pressed, a touch-screen or track-pad being touched by the user. This combination may also be referred to as the 'active application name and window title' (AANWT).

The notion of window 'ownership' or 'owner' is a term used to describe the application that created and/or is responsible for instructing the operating systems what should be rendered in that window (i.e. the active application). The mechanics of how to obtain these particulars are described later herein with reference to using the AppleScript engine of the OS X operating system.

There are various approaches to passively collecting the information about the active window title on a given worker's computer. In the present embodiment, the Mac OS X operating system is used as the basis of describing this operation. A personal skilled in the art would understand that the API calls under the Win32 environment may differ in name, but provide similar functionality.

There are two significant aspects to the creation of data rows that contain the user identifier (in the form of a username or email address), the active window title, and the time period that the window title was active. Firstly, that the window title, preferably also including the application name is tracked; and secondly, that the active window is only tracked when it can be ascertained that the worker is actively engaged with the computer. If after a predetermined or dynamic time period, e.g. 60 seconds, there has been no inputs from the user such as moving the mouse or pressing a key, then the system should allocate all time following and until further input is detected as 'offline'. Preferably, a user dialog is presented to the user when user input is again detected, giving them the option to enter a comment about the time spent away from the computer.

In the present embodiment, a background process that links with the AppleScript API is adopted to implement this aspect of the invention.

At anytime, the process name and window title of the current active application can be captured. In AppleScript on Mac OS X, this can be achieved by calling 'tell process frontAppName' and 'tell (1st window whose value of attribute "AXMain" is true)'. Using one approach, a background process can continually poll the AppleScript periodically to gather historic records of active application switching. This method is illustrated in FIG. 7b.

The user identifier in the form of a username may be determined via AppleScript by calling 'set user_name to (short user name of (system info))'. Alternatively, if the username needs to mirror another system, i.e. a central directory of usernames maintained by the organization, or takes the form of an email address, it may be stored in a settings file accessible by the process that is collecting the information about the window titles and creating the data rows.

In an alternative configuration, a plurality of data rows may be received from an external data storage and application provider, such as that provided by the RescueTime.com application and its associated API. For organizations where the processes and methods are confidential, or where confidential information may be gleaned from analysis of the activities of its knowledge workers, or an organization with a large number of users, the use of an external data storage and application provider may be highly undesirable.

In another preferred configuration, the system registers to receive user action events, and obtains the application name and window title at the time that each user event occurs.

Each record has an associated time period, starting from the timestamp when the current active window was first detected until a new active window title bar description is detected.

For example, 'tell (1st window whose value of attribute "AXMain" is true)' may return the following sequence at the following times . . . .

20130427-17:15:38.277: windowName=MS Word, windowTitle=P186TG-2-Pleadings.docx
20130427-17:16:20.061: windowName=MS Outlook, windowTitle=Re: P186TG2 Review of draft pleadings
20130427-17:16:22.783: windowName=Google Chrome, window-Title=https://www.lexisnexis/?search=pleadings-precedent
20130427-17:16:23.463: windowName=Google Chrome, windowTitle=Pleadings precedents.pdf
20130427-17:16:54.634: windowName=Firefox, windowTitle=Case Docket WebApp-P642TH-6
20130427-17:16:55.307: windowName=MS Outlook, windowTitle=P642T6 Re: Follow-up re meeting
20130427-17:16:56.035: windowName=Google Chrome, windowTitle=TT_Pleading_v9 [P1682G-3]
20130427-17:17:01.221: windowName=Firefox, windowTitle=Case Docket WebApp: P642TH-6
20130427-17:17:05.285: windowName=MS Outlook, windowTitle=Re: Rotor assembly [P186TG-4]
20130427-17:17:17.577: windowName=Google Chrome, windowTitle=Rotar assembly [P186TG-4].CAD This approach takes advantage of a common windowing strategy of operating systems and additionally in some applications that support an internal tabbed interface such as web browsers, where each window has a unique and transient 'Z order' to determine which window should be displayed to the user. At anytime, there can only be one window or tab that is 'active', that is, that has the front-most Z order.

FIG. 4 details an algorithm implemented by the active window monitor module 52 (may also be referred to as window activity monitor module or WAMM).

When the process is first launched, the process registers to receive all direct user interaction events at 1210, including mouse events (movements or clicks) and keystroke events (keydown, touchscreen drag event, mouse click, keyup and so on). Other direct user interaction events may include touch-screen related events, or specialist assistive technologies for sensory impaired users.

A convention of current operating systems is that whenever a document is opened, its window becomes the 'active' window. That is, no other windows overlay it. When a direct user interaction event is received, the next step of the active window monitor module 50 at 1212, is to obtain the application name and window title (method previously described).

Upon the operating system event bus sending a mouse event or keystroke event to the active window monitor module 50 at 1040, most particulars of the user interaction event is preferably discarded (for privacy or efficiency reasons). For example, in the case of a user interaction event in the form of the user having pressed a key on a keyboard, the key that was pressed should preferably be discarded, for both privacy and security reasons.

If a timestamp of when the event occurred is included in the user interaction event generated by the computing device 14, it should preferably be retained. Alternatively, if a timestamp is not included in the event, the timestamp should be calculated by obtaining the system's hardware clock. A user activity data record 64 (that is, an log of the event) is created and ultimately saved to the user activity data store. The user activity data store is preferably located on a remote machine. Alternatively, the user activity data store may be stored on the computing device 14 that the active window monitor module 50 is monitoring.

At the time the user interaction event is received, the active application name, active window title should be obtained, to ascertain which window of the computing device 14 the user is interacting with. There may be many user interaction events received each second when the user is using their computing device 14, and hence it is preferable to amalgamate any identical and sequential user activity data records 64 together, to form a start and end timestamp.

Figure 8:
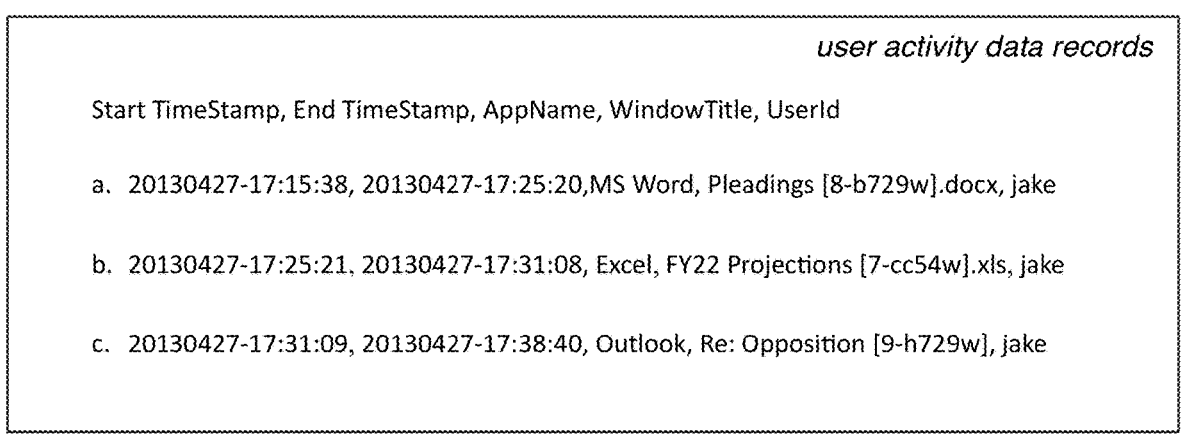
FIG. 8 illustrates a set of sample user activity data records.

A user activity data record 64 preferably includes a start timestamp value and a user identifier. It may also include an end timestamp value, an active application name, and an active window title. A set of sample user activity data records 64 is illustrated in FIG. 8.

It is preferable for a subset of user activity data records 64 to include user location information, such as geographical co-ordinates and/or a textual description of the location that the geographical co-ordinates references.

An example chronological timesheet for a computing device user over a given time period is provided in FIG. 12.

It will be appreciated that embodiments of the present invention provide a method, apparatus, server, system, and computer-readable medium for collecting definitive data relating to time expenditure of a knowledge worker. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention.

It will also be understood the references to a first second and third sets of user activity data records, are sets defined as a reference to their content, and may be implemented in a single memory location, where the values of that memory change over time. Alternatively, they may be saved in memory as separate and distinct sets.

Although a few embodiments of the present invention have been shown and described, it would be appreciated by those skilled in the art that changes may be made in this embodiment without departing from the principles and spirit of the invention, the scope of which is defined in the claims and their equivalents.

As will be appreciated by one skilled in the art, aspects of the present invention may be embodied as a system, apparatus, method or computer program product, Accordingly, aspects of the present invention may take the form of an entirely hardware embodiment, an entirely software embodiment (including firmware, resident software, micro-code, etc,) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

The described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and/or encoding a computer program of instructions for executing a computer process.

In the present embodiment, there are detailed descriptions of implementation details with reference to specific operating systems. The skilled reader will appreciate that any methods or functions defined with reference to a specific operating system may have equivalent or analogous operations available in other operating systems. While the equivalent or analogous operations may differ in name and in the underlying implementation, alternatives may be used to achieve similar effect to that described.

The present embodiment describes a sequence of modules, calculators, managers and data stores. These elements can be run across a plurality of computing devices 14 that are connected via one or more computer networks. They may be implemented using preconfigured digital circuits or circuitry, or using pre-compiled or pre-sequenced software that is executed on digital circuitry. The elements could be grouped into a single computing device 14, or a single application running on the computing device 14. The description of the system and method with reference to logical entities is to aide the reader's understanding of the system and method, and the description and figures is to illustrate and inform, and the segmentation of responsibility of the elements, or general arrangement of responsibilities of the elements, may be varied according to the specific technical considerations of each implementation.

Any combination of one or more computer readable medium(s) may be utilized. The computer readable medium may be a computer readable signal medium or a computer readable storage medium, A computer readable storage medium may be but are not limited to, for example, an electronic, magnetic, optical, electromagnetic, infrared, or semiconductor system, apparatus, or device, or any suitable combination of the foregoing, More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention 30 may be written in any combination of one or more programming languages, including an object oriented programming language such as Java, Smalltalk, C++ or the like and conventional procedural programming languages, such as the "C" programming language or similar programming languages, The program code may execute entirely on the user's computer, partly on the user's computer, as a stand-alone software package, partly on the user's computer and partly on a remote computer or entirely on the remote computer or server, In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions, These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the 20 function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or the programmable apparatus provide processes for implementing the functions/acts specified in the flowchart and/or block diagram block or blocks.

Referring again to FIGS. 1-8, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function (s). It should also be noted that, in some alternative implementations, the functions noted in the block may occur out of the order noted in the figures, For example, two blocks shown in succession may, in fact, be executed substantially concurrently, or the block may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-8, can also include, as described herein, providing a system, wherein the system includes distinct modules (e,g, modules comprising software, hardware or software and hardware). One or more embodiments can make use of software running on a general purpose 10 computer or workstation, With reference to FIG. 2, such an implementation may employ, for example, a processor device 60, a memory 68, and an input/output interface formed, for example, by a display and a keyboard 70. The term "processor device" as used herein is intended to include any processing device, such as, for example, one that includes a CPU (central processing unit) and/or other forms of processing circuitry, Further, the term "processor device" may refer to more than one individual processor, The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer)

The processor device 60, memory 68, and input/output interface such as a display and mouse 70 can be interconnected, for example, via bus as part of data processing unit. Suitable interconnections, for example, via bus, can also be provided to a network interface, such as a network card, which can be provided to interface with a computer network, and to a media interface, such as a diskette or CD-ROM drive, which can be provided to interface with media.

The invention claimed is:

1. A computer implemented method for generating a chronological timesheet for a computing device user over a given time period, said method performed by a timesheet generator apparatus comprising a user activity data receiving module and a processor configured to implement a normalisation module, and said method comprising the steps of:
by the processor, dividing said given time period into a sequence of lesser-duration time periods of predetermined duration, and generating a new timesheet for each said lesser-duration time periods;

for each new timesheet, performing the steps of:

the user activity receiving module receiving a first set of user activity data records associated with a user identifier for a time period, each user activity data record containing a time representation including a duration value and a descriptive element of actions performed by said user on the computing device during said time representation;

the normalisation module applying a high-pass filter to the first set of user activity data records to form a filtered second set of user activity data records, wherein applying the high-pass filter comprises determining if a time entry value is less than a predetermined cut-off determinate, and, if so, removing the time entry value from the first set of user activity data records;

the normalisation module creating an expanded third set of user activity data records by applying a function to the duration of the user activity data records of the filtered second set of user activity data records, wherein the duration value of one or more user activity data records of the expanded third set of user activity data records is greater than the corresponding user activity data record of the filtered second set of user activity data records, and whereby an aggregate of duration values of the third set of user activity data records is less than or equal to the duration of the given time period, and after performing the above steps for each new timesheet, collating each new timesheet into chronological order to generate a timesheet for said given time period; and after an active window time period has elapsed without inputs from the user, the active window time period being a predetermined or dynamic time period, allocating all time following and until further input is detected as offline and presenting a user dialog to the user when user input is again detected, wherein the user dialog gives the user the option to enter a comment about time spent away from the computing device;

wherein creating the expanded third set of user activity data records comprises expanding the duration values of one or more user activity data records of the filtered second set of user activity data records.

2. The computer implemented method of claim 1, whereby the duration value of one or more user activity data records of the filtered second set of user activity data records is expanded using a function $$\delta\left(\frac{durationValue}{\beta}\right),$$

whereby $\delta$ is the numerical difference between the aggregate duration values of the first and second sets of user activity data records, and whereby $\beta$ is the aggregate of duration values in the second set of user activity data records.

3. The computer implemented method according to claim 1, whereby the duration value of one or more user activity data records of the filtered second set of user activity data records is expanded using a function $$\delta\left(\frac{1}{\Psi}\right),$$

whereby $\delta$ is the numerical difference between the aggregate duration values of the first and second sets of user activity data records, and whereby $\Psi$ is the number of records in the second set of user activity data records.

4. The computer implemented method of claim 1, wherein the first set of user activity data records are gathered by a further step of registering to receive user input events of a computing device using a windowing system that the computing device user is operating, and recording the window particulars of the foremost window of the computing device as user input events are received to create one or more user activity data records associated with a user identifier.

5. A computer program comprising program code adapted configured to perform the method steps of claim 1 when said program code is executed by a computer.

6. The computer implemented method according to claim 1, whereby the timesheet generator apparatus further comprises an active window monitoring module, and wherein the steps performed for each new timesheet further comprise a step of, with the active window monitoring module, generating, retaining, and providing the first set of user activity data records associated with the user identifier for the time period.

7. A timesheet generator apparatus for generating a chronological timesheet for a computing device user over a given time period on a computer system comprising:

a memory;

a user activity data receiving module configured to receive a first set of user activity data records for the time period associated with a user identifier, each user activity data record containing a time representation including duration value and descriptive element of actions performed by said user on the computing device during said time representation;

a processor device operatively coupled to the memory and user activity data receiving module, the processor device configured to implement a normalisation module, and the normalisation module configured to:

apply a high-pass filter to the first set of user activity data records to form a filtered second set of user activity data records, wherein applying the high-pass filter comprises determining if a time entry value is less than a predetermined cut-off determinate, and, if so, removing the time entry value from the first set of user activity data records;

create an expanded third set of user activity data records by applying a function to the duration of the user activity data records of the filtered second set of user activity data records, wherein the duration value of one or more user activity data records of the expanded third set of user activity data records is greater than the corresponding user activity data record of the filtered second set of user activity data records, and whereby an aggregate of duration values of the second set of user activity data records is less than or equal to the duration of the given time period, wherein the processor device first divides said given time period into a sequence of lesser duration time periods of predetermined duration, whereby a timesheet for each said lesser duration time periods is generated, and the processor device subsequently collates each timesheet into chronological order to generate the timesheet for said given time period, and wherein after an active window time period has elapsed without inputs from the user, the active window time period being a predetermined or dynamic time period, the processor device allocates all time following and until further input is detected as offline and presents a user dialog to the user when user input is again detected, wherein the user dialog gives the user the option to enter a comment about time spent away from the computing device; and wherein creating the expanded third set of user activity data records comprises expanding the duration values of one or more user activity data records of the filtered second set of user activity data records.

8. The timesheet generator apparatus of claim 7, wherein the processor device expands the duration value of one or more user activity data records of the filtered second set of user activity data records by a function $$\delta\left(\frac{durationValue}{\beta}\right),$$

whereby δ is the numerical difference between the aggregate duration values of the first and second sets of user activity data records, and whereby β is the aggregate of duration values in the second set of user activity data records.

9. The timesheet generator apparatus of claim 7, further comprising an active window monitoring module configured to generate, retain, and provide the first set of user activity data records associated with the user identifier for the time period.

10. The timesheet generator apparatus of claim 7, wherein the processor device expands the duration value of one or more user activity data records of the filtered second set of user activity data records by a function $$\delta\left(\frac{1}{\Psi}\right),$$

whereby δ is the numerical difference between the aggregate duration values of the first and second sets of user activity data records, and whereby Ψ is the number of records in the second set of user activity data records.

11. The timesheet generator apparatus of any one of claim 7, the user activity data receiving module further comprising an active window monitor module, to monitor the active window title of a computing device, by registering to receive user input events of the computing device using a windowing system, and obtaining the window title of the foremost window of the computing device when user input events are received to thereby generate user activity data records.

12. The timesheet generator apparatus of claim 11, wherein the active window monitor module persists user activity data records to a user activity data store.

13. A non-transitory computer-readable medium storing computer program code configured to configure a computer to perform method steps for generating a chronological timesheet for a computing device user over a given time period comprising:

providing, on the computer, a user activity data receiving module and configuring a processor of the computer to implement a normalisation module;

by the processor, dividing said given time period into a sequence of lesser-duration time periods of predetermined duration, and generating a new timesheet for each said lesser-duration time periods;

for each new timesheet, performing the steps of:

the user activity receiving module receiving a first set of user activity data records associated with a user identifier for a time period, each user activity data record containing a time representation including a duration value and a descriptive element of actions performed by said user on the computing device during said time representation;

the normalisation module applying a high-pass filter to the first set of user activity data records to form a filtered second set of user activity data records, wherein applying the high-pass filter comprises determining if a time entry value is less than a predetermined cut-off determinate, and, if so, removing the time entry value from the first set of user activity data records;

the normalisation module creating an expanded third set of user activity data records by applying a function to the duration of the user activity data records of the filtered second set of user activity data records, wherein the duration value of one or more user activity data records of the expanded third set of user activity data records is greater than the corresponding user activity data record of the filtered second set of user activity data records, and whereby an aggregate of duration values of the third set of user activity data records is less than or equal to the duration of the given time period, and after performing the above steps for each new timesheet, collating each new timesheet into chronological order to generate a timesheet for said given time period; and after an active window time period has elapsed without inputs from the user, the active window time period being a predetermined or dynamic time period, allocating all time following and until further input is detected as offline and presenting a user dialog to the user when user input is again detected, wherein the user dialog gives the user the option to enter a comment about time spent away from the computing device;

wherein creating the expanded third set of user activity data records comprises expanding the duration values of one or more user activity data records of the filtered second set of user activity data records.

14. A non-transitory signal-bearing medium configured to provide encoded computer program code to a computer in the form of an electromagnetic carrier wave, the computer program code configured to configure a computer such that when said electromagnetic carrier wave is decoded by the computer and said program code is executed by the computer, the computer is adapted to perform method steps for generating a chronological timesheet for a computing device user over a given time period comprising:

providing, on the computer, a user activity data receiving module and configuring a processor of the computer to implement a normalisation module;

by the processor, dividing said given time period into a sequence of lesser-duration time periods of predetermined duration, and generating a new timesheet for each said lesser-duration time periods;

for each new timesheet, performing the steps of:

the user activity receiving module receiving a first set of user activity data records associated with a user identifier for a time period, each user activity data record containing a time representation including a duration value and a descriptive element of actions performed by said user on the computing device during said time representation;

the normalisation module applying a high-pass filter to the first set of user activity data records to form a filtered second set of user activity data records, wherein applying the high-pass filter comprises determining if a time entry value is less than a predetermined cut-off determinate, and, if so, removing the time entry value from the first set of user activity data records;

the normalisation module creating an expanded third set of user activity data records by applying a function to the duration of the user activity data records of the filtered second set of user activity data records, wherein the duration value of one or more user activity data records of the expanded third set of user activity data records is greater than the corresponding user activity data record of the filtered second set of user activity data records, and whereby an aggregate of duration values of the third set of user activity data records is less than or equal to the duration of the given time period, and after performing the above steps for each new timesheet, collating each new timesheet into chronological order to generate a timesheet for said given time period; and after an active window time period has elapsed without inputs from the user, the active window time period being a predetermined or dynamic time period, allocating all time following and until further input is detected as offline and presenting a user dialog to the user when user input is again detected, wherein the user dialog gives the user the option to enter a comment about time spent away from the computing device;

wherein creating the expanded third set of user activity data records comprises expanding the duration values of one or more user activity data records of the filtered second set of user activity data records.

15. A multi-node cluster apparatus configured to implement a timesheet generator, the multi-node cluster apparatus comprising at least two separate nodes arranged in a cluster, the cluster configured to perform method steps for generating a chronological timesheet for a computing device user over a given time period, wherein the cluster comprises at least a normalisation module, a user activity receiving module, and an active window monitor module, and wherein the method steps comprise:

providing, with the cluster, a user activity data receiving module and a normalisation module;

with the cluster, dividing said given time period into a sequence of lesser-duration time periods of predetermined duration, and generating a new timesheet for each said lesser-duration time periods;

for each new timesheet, performing the steps of:

the user activity receiving module receiving a first set of user activity data records associated with a user identifier for a time period, each user activity data record containing a time representation including a duration value and a descriptive element of actions performed by said user on the computing device during said time representation;

the normalisation module applying a high-pass filter to the first set of user activity data records to form a filtered second set of user activity data records, wherein applying the high-pass filter comprises determining if a time entry value is less than a predetermined cut-off determinate, and, if so, removing the time entry value from the first set of user activity data records;

the normalisation module creating an expanded third set of user activity data records by applying a function to the duration of the user activity data records of the filtered second set of user activity data records, wherein the duration value of one or more user activity data records of the expanded third set of user activity data records is greater than the corresponding user activity data record of the filtered second set of user activity data records, and whereby an aggregate of duration values of the third set of user activity data records is less than or equal to the duration of the given time period, and after performing the above steps for each new timesheet, collating each new timesheet into chronological order to generate a timesheet for said given time period; and after an active window time period has elapsed without inputs from the user, the active window time period being a predetermined or dynamic time period, allocating all time following and until further input is detected as offline and presenting a user dialog to the user when user input is again detected, wherein the user dialog gives the user the option to enter a comment about time spent away from the computing device;

wherein creating the expanded third set of user activity data records comprises expanding the duration values of one or more user activity data records of the filtered second set of user activity data records.

* * * * *